United States Patent
Bhattacharya et al.

(10) Patent No.: US 9,602,599 B2
(45) Date of Patent: *Mar. 21, 2017

(54) COORDINATING APPLICATION MIGRATION PROCESSES

(71) Applicant: International Business Machines Corporation, Armonk, NY (US)

(72) Inventors: Kamal K. Bhattacharya, Bangalore (IN); Chen Hua Feng, Beijing (CN); Yun-Wu Huang, Chappaqua, NY (US); Ying Huang, Yorktown Heights, NY (US); Hani Jamjoom, Cos Cob, CT (US); Pu Jin, Beijing (CN); Fan Jing Meng, Beijing (CN); Michael Montinarelli, Yorktown Heights, NY (US); Mark E. Podlaseck, Kent, CT (US); Zon-Yin Shae, Yorktown Heights, NY (US); Daniel J. Williams, Ithaca, NY (US)

(73) Assignee: International Business Machines Corporation, Armonk, NY (US)

( * ) Notice: Subject to any disclaimer, the term of this patent is extended or adjusted under 35 U.S.C. 154(b) by 93 days.

This patent is subject to a terminal disclaimer.

(21) Appl. No.: 13/969,974

(22) Filed: Aug. 19, 2013

(65) Prior Publication Data
US 2014/0359128 A1 Dec. 4, 2014

Related U.S. Application Data

(63) Continuation of application No. 13/904,498, filed on May 29, 2013.

(51) Int. Cl.
G06F 15/16 (2006.01)
H04L 29/08 (2006.01)
(Continued)

(52) U.S. Cl.
CPC ........ *H04L 67/1097* (2013.01); *G06F 9/4856* (2013.01); *H04L 41/5096* (2013.01); *H04L 67/34* (2013.01)

(58) Field of Classification Search
USPC .................................................. 709/217, 226
See application file for complete search history.

(56) References Cited

U.S. PATENT DOCUMENTS 8,285,681 B2 10/2012 Prahlad et al.
8,966,582 B1 * 2/2015 Ainslie ................... G06F 21/51
726/2
(Continued)

OTHER PUBLICATIONS

Lawler, Cloud Service Broker: Model for Optimized Cloud Use, Sustainable Governance and Efficient Cloud Utilization, Green IT Cloud Summit 2012 Washington, D.C., Apr. 18, Sheraton Premier, Tysons Corner.
(Continued)

*Primary Examiner* — Kristie Shingles
*Assistant Examiner* — Mohammad Yousuf A Mian
(74) *Attorney, Agent, or Firm* — Ryan, Mason & Lewis, LLP

(57) ABSTRACT

Systems and articles of manufacture for coordinating application migration processes include selecting at least one migration service for an application based on analysis of application information and information pertaining to multiple migration services, creating a migration plan to migrate the application to a target cloud based on the at least one selected migration service, and executing the migration plan, utilizing the at least one selected migration service, to migrate the application to the target cloud.

20 Claims, 7 Drawing Sheets

(51) Int. Cl.
*H04L 12/24* (2006.01)
*G06F 9/48* (2006.01)

(56) References Cited

U.S. PATENT DOCUMENTS

| | | | |
|---|---|---|---|
| 2006/0179431 A1* | 8/2006 | Devanathan | G06F 8/61 717/168 |
| 2007/0276710 A1* | 11/2007 | Hudgeon | G06Q 10/06395 705/7.41 |
| 2010/0293412 A1* | 11/2010 | Sakaguchi | G06F 11/0715 714/17 |
| 2011/0107327 A1* | 5/2011 | Barkie | G06F 8/63 717/176 |
| 2011/0231899 A1 | 9/2011 | Pulier et al. | |
| 2011/0252382 A1* | 10/2011 | Bhaskaran | G06Q 10/06 715/853 |
| 2012/0072709 A1 | 3/2012 | Joukov et al. | |
| 2012/0096161 A1 | 4/2012 | Sethi et al. | |
| 2012/0151061 A1 | 6/2012 | Bartfai-Walcott et al. | |
| 2012/0185913 A1 | 7/2012 | Martinez et al. | |
| 2013/0085989 A1* | 4/2013 | Nayyar | G06F 17/30079 707/610 |
| 2015/0269053 A1* | 9/2015 | Kato | G06F 11/3428 718/105 |

OTHER PUBLICATIONS

Tsai et al., Service-Oriented Cloud Computing Architecture, 2010 Seventh International Conference on Information Technology.
Kaisler et al., Service Migration in a Cloud Architecture, Proceedings of the 44th Hawaii International Conference on System Sciences, 2011.
Matthews et al., Virtual Machine Contracts for Datacenters and Cloud Computing Environments, ACDC'09, Jun. 19, 2009, Barcelona, Spain.

* cited by examiner

COORDINATING APPLICATION MIGRATION PROCESSES

CROSS-REFERENCE TO RELATED APPLICATIONS

This application is a continuation of U.S. patent application Ser. No. 13/904,498, filed May 29, 2013, and incorporated by reference herein.

FIELD OF THE INVENTION

Embodiments of the invention generally relate to information technology, and, more particularly, to application migration technology.

BACKGROUND

Cloud computing includes computing resources as services delivered over the Internet. Migrating existing enterprise applications into the cloud presents challenges. For instance, an application may often include multiple network-connected servers hosting various middleware and software. Accordingly, to migrate such an application to the cloud, typically all of the application components need to be migrated as one unit (that is, within a specified time period) in order to ensure prompt and successful operation of the application after migration.

In existing approaches, individual vendors often provide proprietary migration technologies for a specific target cloud environment for some types of applications. Some vendor migration technologies may work well for certain components in an application, but not for all components therein. Migrating an application using such migration technologies may result in costly and lengthy remediation processes typically performed by professional services. However, users usually lack knowledge in how well various migration technologies work for different types of components, and how multiple migration technologies can be integrated to work together to migrate an application. As a result, users may not select appropriate migration technologies, thereby relying on a migration process that is time-consuming, error-prone, and costly.

SUMMARY

In one aspect of the present invention, techniques for coordinating application migration processes are provided. An exemplary computer-implemented method can include steps of selecting at least one migration service for an application based on analysis of application information and information pertaining to multiple migration services, creating a migration plan to migrate the application to a target cloud based on the at least one selected migration service, and executing the migration plan, utilizing the at least one selected migration service, to migrate the application to the target cloud.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps.

Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
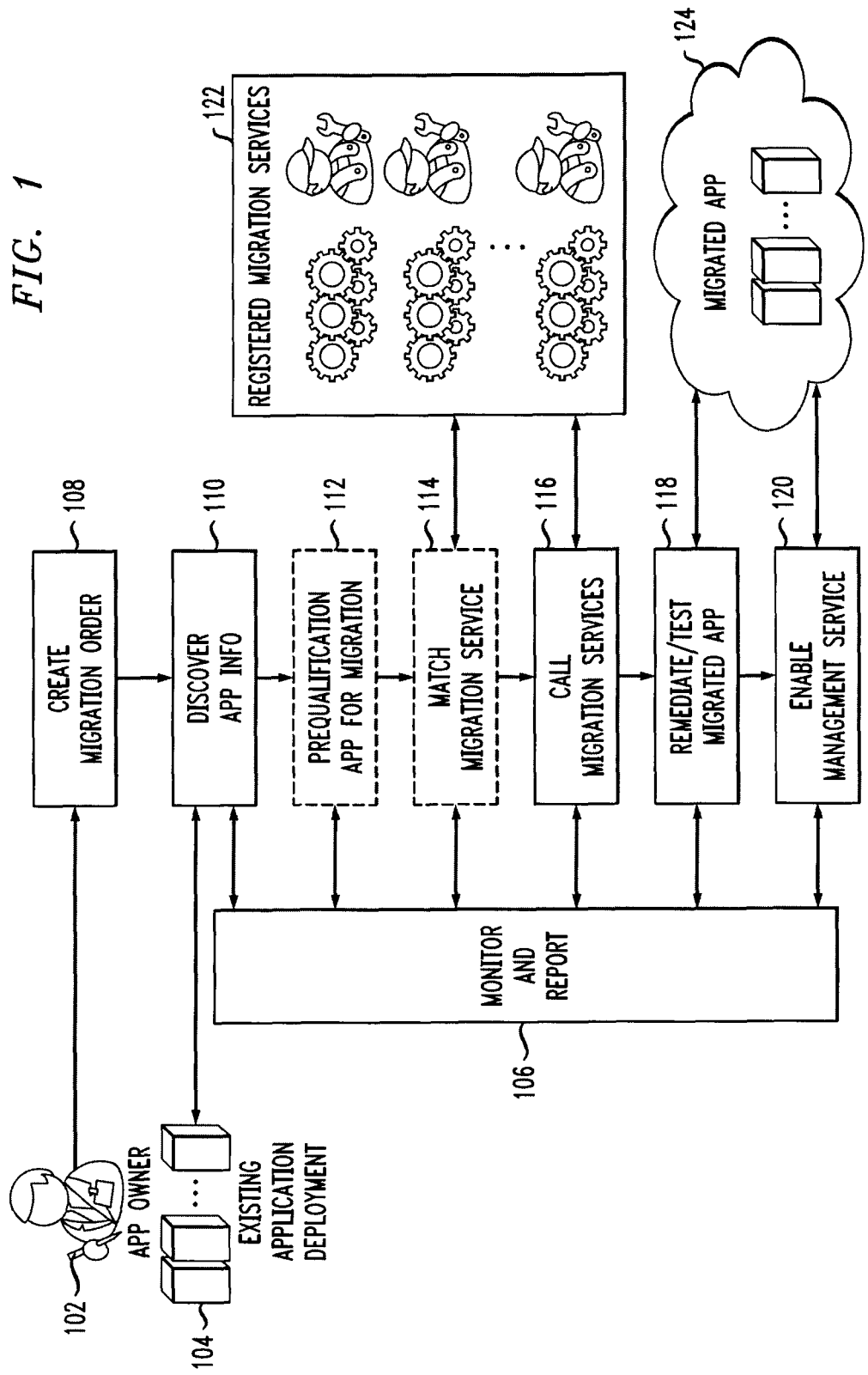
FIG. 1 is a diagram illustrating a migration process via a migration broker, according to an embodiment of the present invention.

As described herein, an aspect of the present invention includes techniques for providing migration broker capabilities as a service. Additionally, at least one embodiment of the invention includes a migration broker framework capable for use by a vendor to plug-in an individual migration technology. Such a framework can be used to coordinate migration processes among migration service requesters, migration service providers and target clouds.

At least one embodiment of the invention includes creating an application vector which is an array vector of an internal property representation of a given application, and/or systematically categorizing and storing the properties of all components of a given application into an application vector. Additionally, a migration performance matrix can be created which sets a benchmark for the migration cost for migrating a given application with a specific application vector using a given migration technology. At least one embodiment of the invention can also include symmetrically transforming an application vector into a migration cost given the migration technology used.

Further, an application properties analysis engine can be used to transform the given application into the application vector representation. A migration technology analysis engine can also be used to categorize and transform the application vector into the migration cost for a given migration technology. Additionally, in connection with at least one embodiment of the invention, a migration broker is used to optimize the matching between the given application and one or more underlying migration technologies and the target cloud based on minimizing the total migration cost derived from comparative analyses between the application vector and various migration technologies.

Another aspect of the invention includes a migration broker communicating with vendor migration technologies by way of a pre-defined migration broker application programming interface (API). This API defines how a migration broker invokes a specific vendor migration technology, how application meta data are packed and passed to a target vendor migration technology, how the migration broker can monitor the running progress of a target vendor migration technology, and how the migration results are returned from a target vendor migration technology to the migration broker.

As further detailed herein, an aspect of the invention includes matching application migration vendors based on application meta data, and coordinating the vendors to complete a given application migration. Meta data, as used herein, refers to application attributes for cloud migration. Migration service vendor meta data can include migration service vendor information such as vendor name and service description. Migration service vendor meta data can be registered with a migration broker and provide an entry point for its migration technology, as defined by the migration broker API. Further, migration service vendor meta data can include a migration user manual (that is, instructions for an end-user on how to prepare and start a migration task) and a migration service report such as to guide a user on how to access a migrated application or to provide remediation guidelines.

FIG. 1 is a diagram illustrating a migration process via a migration broker, according to an embodiment of the present invention. By way of illustration, FIG. 1 depicts an application owner 102, an existing application deployment 104, registered migration services 122, a monitoring and reporting component 106 and migrated application 124. As illustrated in FIG. 1, the application owner 102 creates a migration order in step 108. Step 110 includes discovering application information from the existing application deployment 104. Such a step can be performed, for example, by the migration requester filling out forms provided by the migration broker API. Alternatively, the discovery process in step 110 can also be achieved by a requester downloading, from the migration broker server, a discovery software agent to be installed in each of the servers of the underlying application. Such a software agent collects information about the application and its components and passes such information to the migration broker to create the meta information for the underlying application (application vector.) By way of example, a client can upload information from the existing application deployment environment via a self-service portal to specify information such as application name, server uniform resource locators (URLs) and/or internet protocols (IPs), and an application profile in extensible markup language (XML) format. The client can also download and install the discovery agent from said migration broker portal to collect and send to the migration broker system the same information.

Step 112 includes pre-qualifying the application for migration. Pre-qualifying includes using the meta information about the underlying application for comparison with the features and capabilities of the target cloud in order to determine if the underlying application does or does not require resources beyond the constraints of the target cloud. Once the application is pre-qualified, step 114 includes matching the application to a migration service from the set of registered migration services 122. In at least one embodiment of the invention, the migration broker framework recommends the most suitable back-end migration service and/or migration services combination for the given application. Such an embodiment includes identifying all capable migration services and/or service combinations to complete the application migration based on an analysis of the application specifications and migration requirements.

Additionally, the migration broker framework assesses and matches an optimal migration service and/or service combination based on selected metrics and/or benchmarking data. An example of metrics used by the migration broker includes the ability of a vendor migration service to migrate some middleware (and potentially the data or applications managed thereby) such as DB2 or Websphere without significant remediation.

Step 116 includes calling the relevant migration service based upon the matching step. After the migration has started, a client can monitor the migration progress and performance via the monitoring and reporting component 106. Step 118 includes remediating and/or testing the migrated application 124. An example remediation step can include the manual process of reconfiguring network addresses from those deployed in the original application to the new addresses on the cloud. Another example remediation step includes reconfiguring middleware and/or application property files to ensure that they are running properly in the new environment.

After migration, the client can be provided a migration completeness notification and the application(s) can be run to test for functionality and performance and perform necessary remediation. Further, step 120 includes enabling management of the migration service associated with the migrated application 124. An example of the management service of a migration broker includes the process required to make migrated server instances manageable by a managed target cloud. While most public clouds to date are unmanaged clouds, some enterprise-grade clouds are examples of managed clouds. A managed cloud requires its hosted components to be compliant to certain configurations and installed with management applications so that the cloud can monitor the components for security, policy, and performance compliance.

By way of example, after the migration completes, the migration result can be presented to the client/user and the client/user can additionally review the application status, migration performance, and virtual machine (VM) information associated with the target cloud. Also, at least one embodiment of the invention additionally includes providing the ability to select migration tasks and enable patch management.

As also illustrated in FIG. 1, the monitoring and reporting component 106 is utilized in the execution of steps 110, 112, 114, 116, 118 and 120. In each of steps 110, 112, 114, 116, 118 and 120, progress and status are presented to the client through the monitoring and reporting component 106. An example of monitoring and reporting for discovery in step 110 includes identifying that discovery may be performed by discovery agents run on the source servers of the underlying application. The discovery agents collect application information and report to the migration broker.

Additionally, step 106 includes depicting the on-going progress so that the client knows when completion has been reached. Step 106 also includes monitoring the progress during the execution of the pre-qualification (112), matching (114), and enabling (120) steps while reporting the progress to the client. In step 116, for which one or more vendor migration technologies are performing the migration services for the underlying application, the monitoring and reporting by the migration broker is achieved through the migration broker API, through which the running vender migration services report current status updates periodically.

Additionally, at least one embodiment of the invention can include decomposing the application into multiple sub-tasks and assigning multiple vendor migration services to perform the different sub-tasks. An aspect of the invention can also include enabling a client to configure back-end migration services (among different services providers). A user guide can allow a client to obtain and/or access various migration steps of selected migration services.

Figure 2:
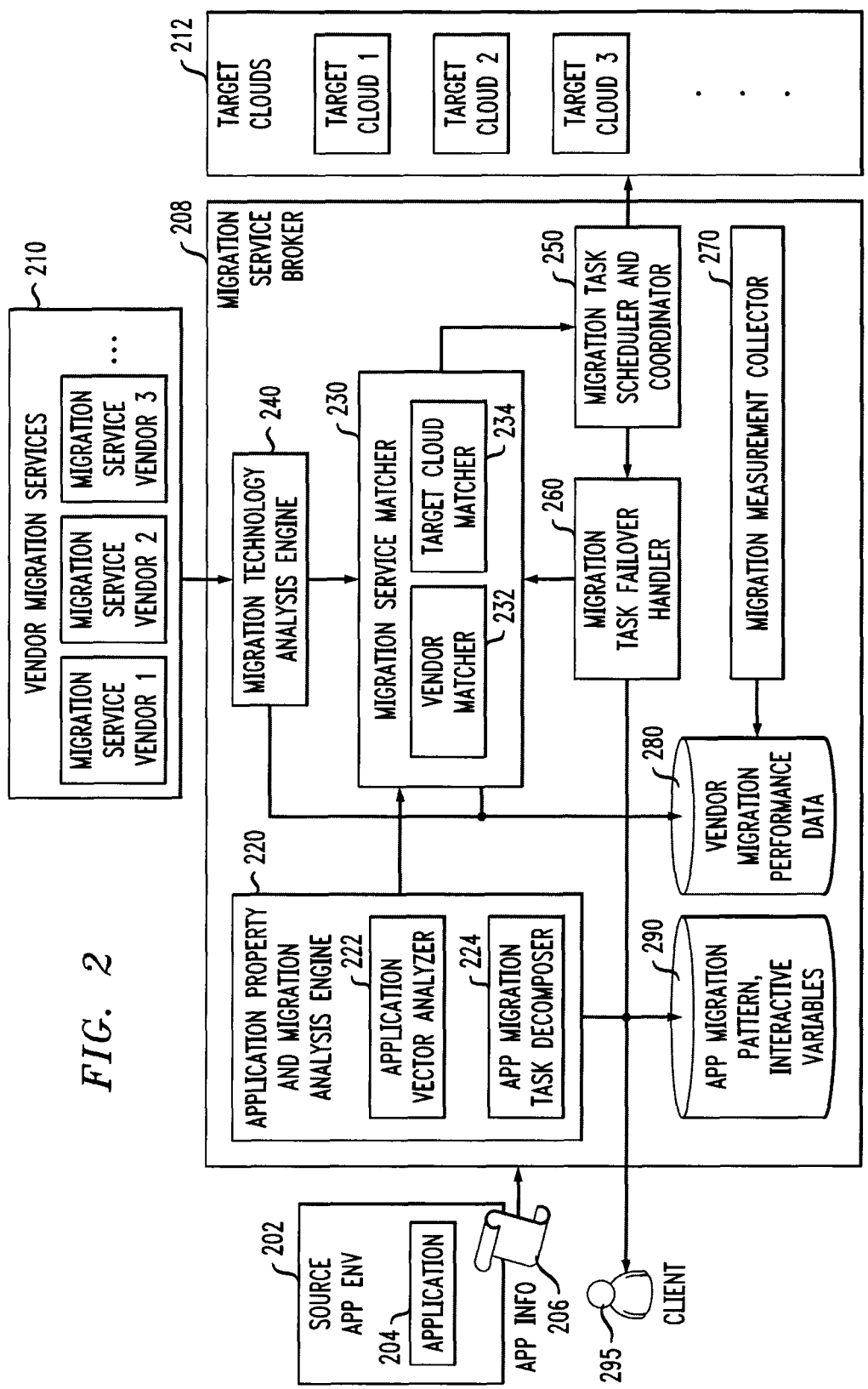
FIG. 2 is a diagram illustrating system architecture, according to an embodiment of the invention.

FIG. 2 is a diagram illustrating system architecture, according to an embodiment of the invention. By way of illustration, FIG. 2 depicts a source application environment 202, which includes an application 204 (which includes application information 206). An example of a source application environment 202 can include a data center hosting computing systems running business applications (such as 204). The application information 206 can be obtained via user input and/or via the aforementioned discovery step (step 110 in FIG. 1). FIG. 2 also depicts a migration service broker 208 (as detailed herein), vendor migration services 210 that have registered their services with migration service broker, target clouds 212, and a client 295.

The migration service broker 208 includes an application property and migration analysis engine 220, which includes an application vector analyzer component 222 and an application migration task decomposer component 224. The application information 206 is passed to the application property and migration analysis engine 220, which transforms the information to an internal representation by the application vector analyzer 222, which is decomposed into migratable components by component 224 before storing the processed data representation into the application migration pattern database 290.

The migration service broker 208 also includes a migration service matcher module 230, which includes a vendor matcher component 232 and a target cloud matcher component 234. The migration service matcher module 230 can create a migration plan by selecting the most appropriate or applicable migration service(s) for a source application. Such an action can be carried out via performing analysis on the application meta data and historical data pertaining to migration services, with one or more objectives that can include a lowest migration failure risk, a lowest total migration cost, a shortest migration time, etc. The target cloud matcher 234 matches the source application based on information received from the application vector analyzer 222 and the target cloud information. Any mismatches would fail the aforementioned pre-qualification step (step 112 in FIG. 1).

Further, the migration service broker 208 includes a migration technology analysis engine 240, a migration task scheduler and coordination component 250, a migration task fail-over handler component 260, and a migration measurement collector component 270. When the migration service matcher 230 selects one or more vendor migration services to perform migration for a source application, the service matcher 230 employs the migration task scheduler and coordinator 250 to formulate the migration plan and to coordinate the migration process integrating potentially multiple vendor migration services. When one vendor migration service fails to migrate its assigned component, the migration task fail-over handler component 260 can devise and schedule a new migration plan with an alternative vendor migration service for the failed component. Additionally, remediation tasks can be coordinated if the migration is successful, and/or failure causes can be analyzed and a next step can be recommended.

Additionally, the migration service broker 208 includes a vendor migration performance data database 280 and an application migration pattern and interactive variables database 290. The vendor migration performance data database 280 maintains meta data for vendor migration services, which can facilitate at least one embodiment of the invention to create a capability profile with feature details for each migration service, as well as to tracks and maintain historical and statistical data for services performed by migration services. The migration technology analysis engine 240 monitors the migration tasks performed by the vendor migration services and records the results in the vendor migration performance database 280. The migration measurement collector 270 accesses result data of the vendor migration services from the vendor migration performance database 280 and computes vendor migration performance metrics to store back to the vendor migration performance database 280. The performance metrics are then used by the vendor matcher 232 processor to select the vendor migration services for a source application.

At least one embodiment of the invention includes defining application programming interfaces (APIs) for facilitating interaction between the migration broker framework and vendor migration services. By way of example, sample APIs can include the following:

Login: An API that creates an authenticated session with the application and returns a Unicode token to be used for other API calls.
Logout: An API that releases the session token.
getUser: An API that retrieves user-specific information such as storage area, agent information, etc.
addUser: An API that creates user-specific information.
checkServers: An API that returns an agent server status.
migrateApplication: An API that initiates a separate, complete migration of an entire complex application.
getTask: An API that retrieves a migration task status.
cancelTask: An API that cancels a migration task.
getTaskLog: An API that retrieves a migration task detail log.
updatemigrationstatus: An API that serves as a callback API for a migration service vendor to invoke an update to the status of a migration task upon the completion of each migration step or upon encountering any exceptional condition.

Figure 3:
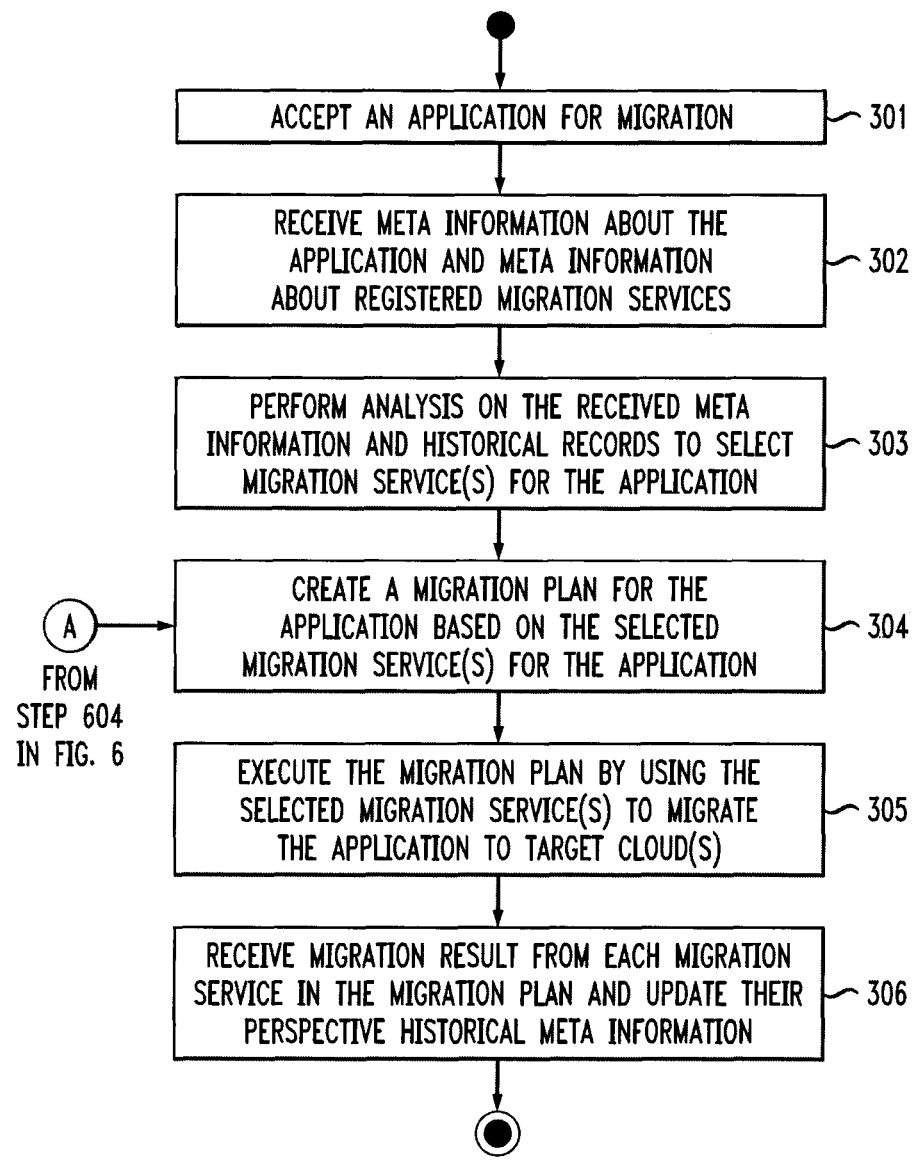
FIG. 3 is a flow diagram illustrating an embodiment of the present invention.

FIG. 3 is a flow diagram illustrating an embodiment of the invention. Step 301 includes accepting an application for migration. Step 302 includes receiving meta information (also referred to herein as meta data) about the application as well as meta information about the migration services registered with the migration services broker (MSB). Meta information about the application can include, for example, discovery data, user-entered data, and existing info from a database. Meta information about migration services can include, for example, service capability, migration history, and connection information.

Step 303 includes performing analysis on the received meta information and historical records to select the best or more appropriate migration service(s) for the application. Such analysis can include, for example, application profiling, benchmark and/or historical data determination, and pattern matching. Step 304 includes creating a migration plan for the application based on the selected best migration services for the application. Within such a migration plan, migration tasks include set-up, capture, readiness, and deployment.

Step 305 includes executing the migration plan, using the migration services selected therein, to migrate the application to the target cloud(s). Step 306 includes receiving a migration result from each migration service in the migration plan and correspondingly updating the historical meta information for each migration service.

Figure 4:
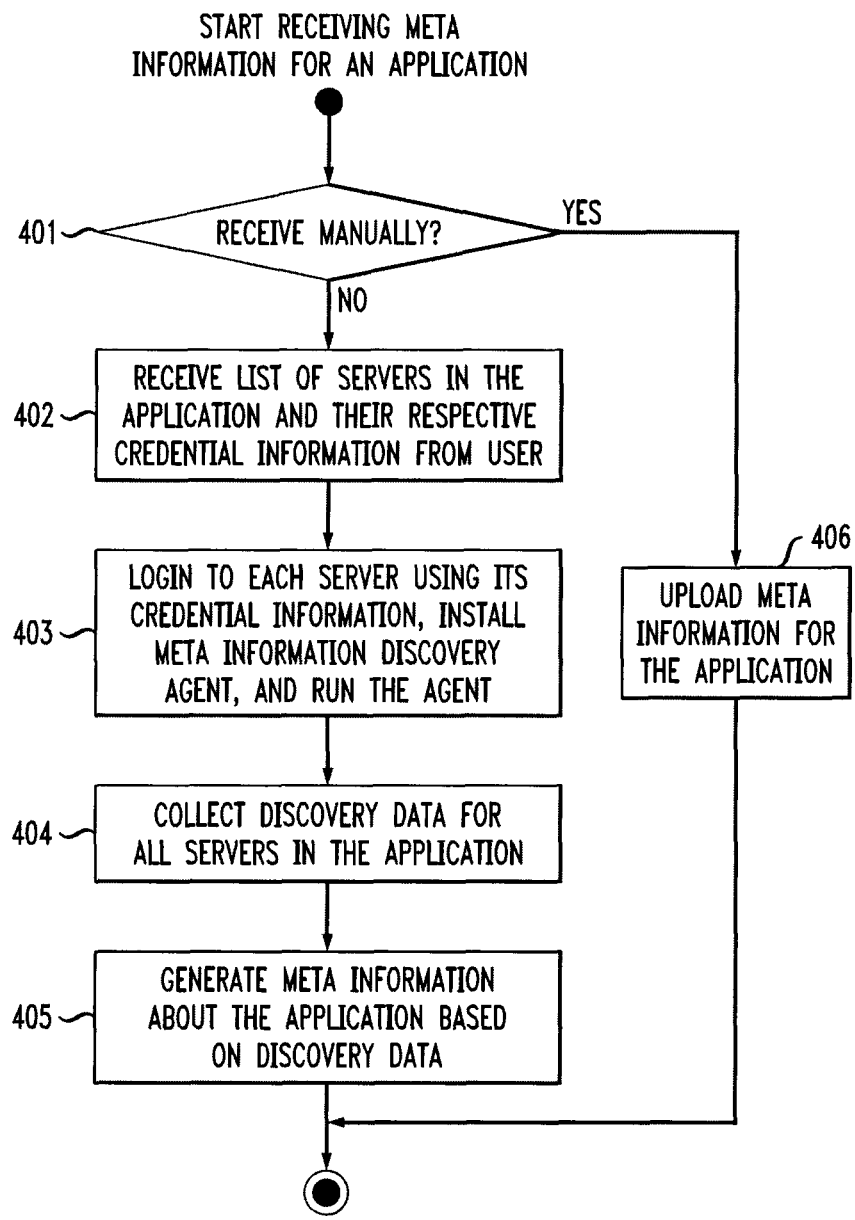
FIG. 4 is a flow diagram illustrating an embodiment of the present invention.

FIG. 4 is a flow diagram illustrating an embodiment of the present invention. By way of illustration, FIG. 4 depicts a sub-technique of step 302 in FIG. 3; that is, the step of receiving meta information about an application and meta information about the registered migration services. Step 401 includes determining whether meta information for the application was received manually. If yes (that is, the meta information was received manually), the flow proceeds to step 406, which includes uploading the meta information for the application. If no (that is, the meta information was not received manually), step 402 includes receiving a list of servers in the application and the respective credential information for each server from the user.

Step 403 includes logging-in to each server using the corresponding credential information, installing a meta information discovery agent, and running the discovery agent therein. Step 404 includes collecting discovery data for all servers in the application (via the agent), and step 405 includes generating meta information about the application based on the discovery data.

Figure 5:
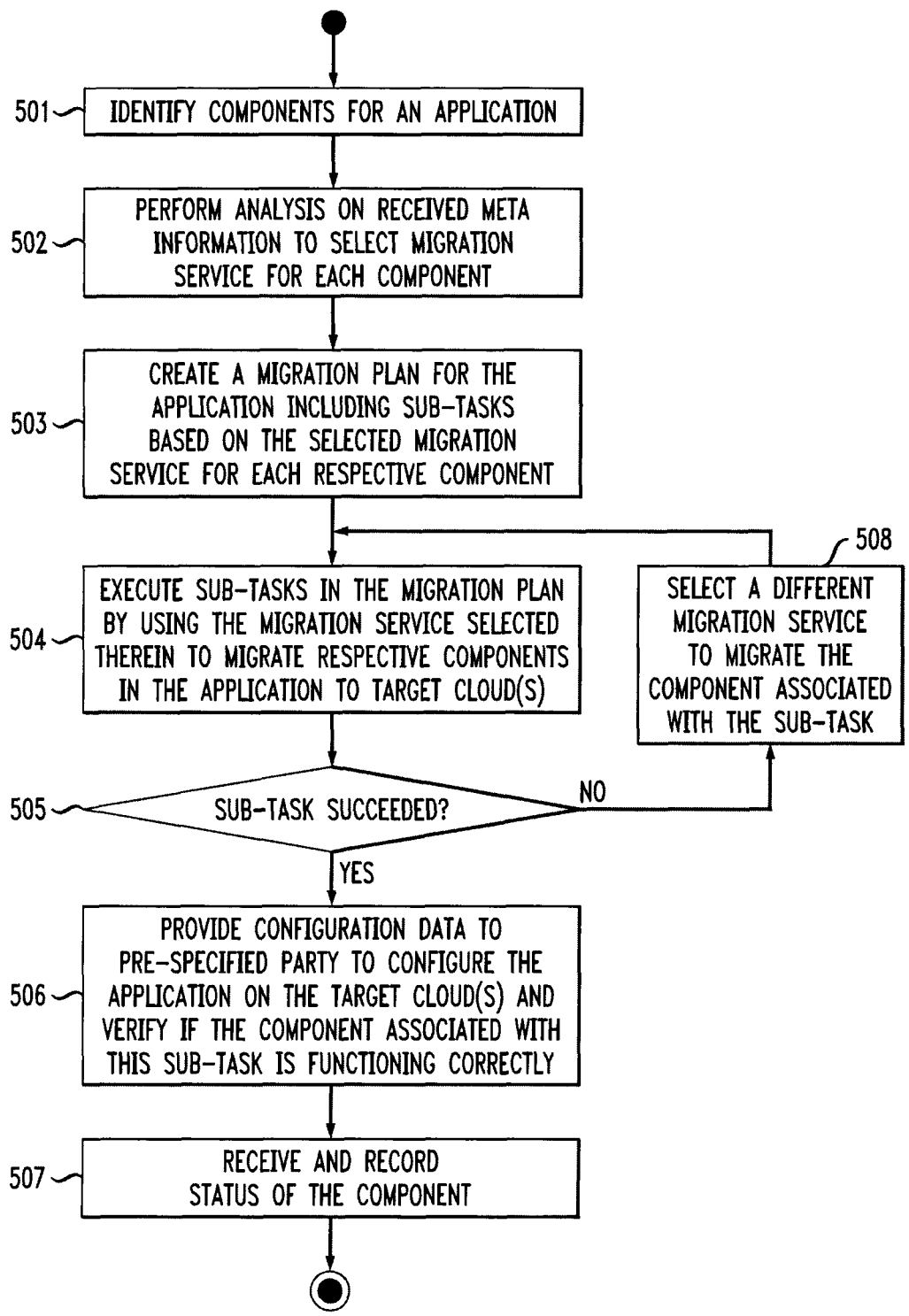
FIG. 5 is a flow diagram illustrating an embodiment of the present invention.

FIG. 5 is a flow diagram illustrating an embodiment of the present invention. By way of illustration, FIG. 5 depicts a sub-technique of steps 303 through 305 in FIG. 3. Step 501 includes identifying multiple components for an application. Step 502 includes performing analysis on received meta information to select a migration service for each component. Step 503 includes creating a migration plan for the application, including each component sub-task, based on the selected migration service for each respective component. Step 504 includes executing the sub-tasks in the migration plan by using the migration service selected therein to migrate the respective components in the application to target cloud(s).

Additionally, step 505 includes determining whether each sub-task succeeded. If no (that is, if a sub-task did not succeed), step 508 includes selecting a different migration service to migrate the component associated with that sub-task. If yes, (that is, a sub-task did succeed), step 506 includes providing configuration data to a pre-specified party to configure the application on the target cloud(s) and verify that the component associated with that sub-task is functioning correctly. Further, step 507 includes receiving and recording the status of the component.

Figure 6:
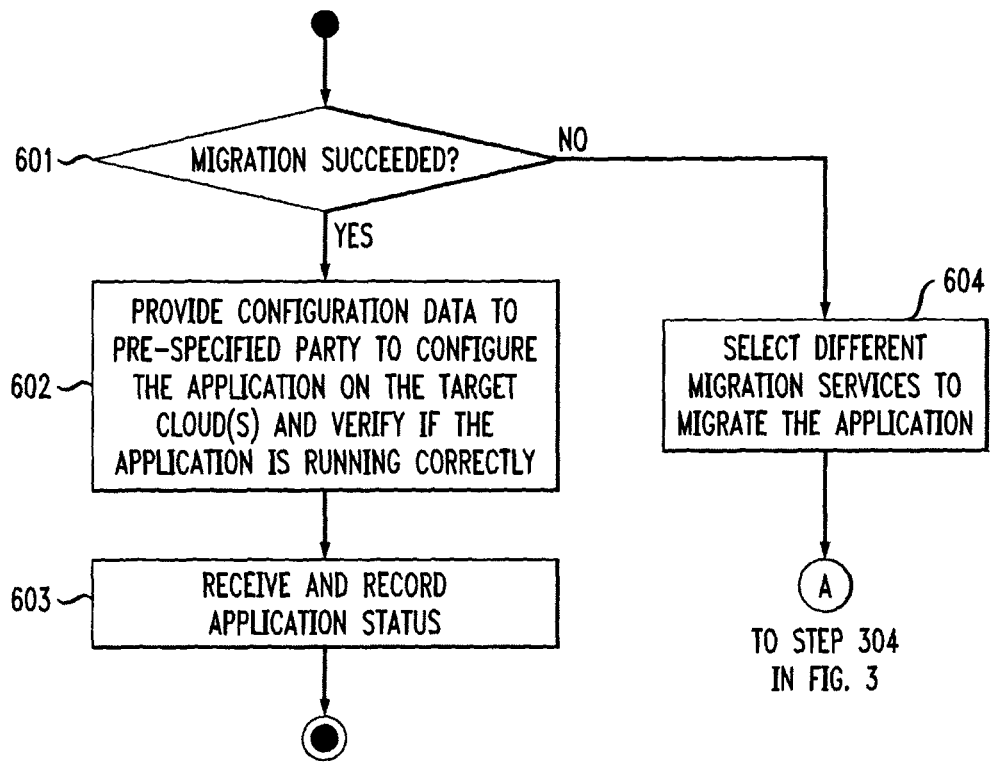
FIG. 6 is a flow diagram illustrating an embodiment of the present invention.

FIG. 6 is a flow diagram illustrating an embodiment of the present invention. By way of illustration, FIG. 6 depicts a sub-technique of step 306 in FIG. 3; that is, the step of receiving a migration result from each migration service in the migration plan and updating their perspective historical meta information. Step 601 includes determining whether a migration succeeded. If no (that is, the migration was not successful), step 604 includes selecting different migration services to migrate the application (and proceeding to subsequent action such as detailed in step 304 in FIG. 3). If yes (that is, the migration was successful), step 602 includes providing configuration data to a pre-specified party to configure the application on the target cloud(s) and verify that the application is running correctly. Additionally, step 603 includes receiving and recording the application status.

Figure 7:
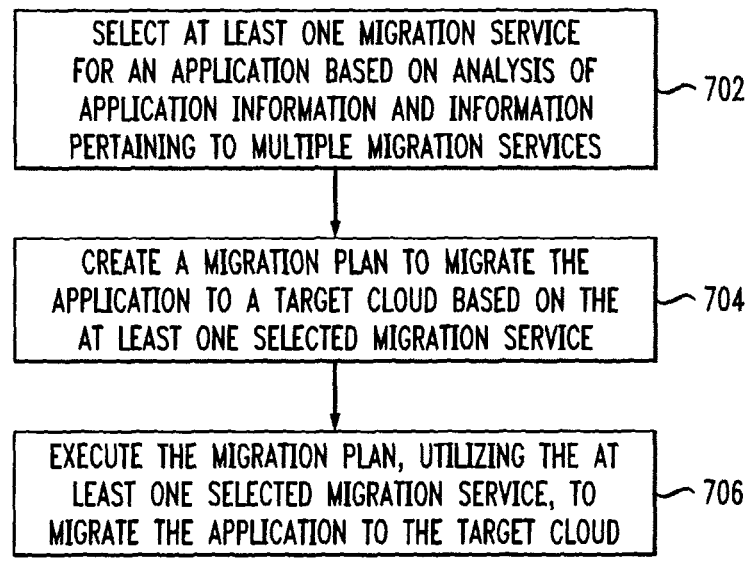
FIG. 7 is a flow diagram illustrating techniques according to an embodiment of the invention.

FIG. 7 is a flow diagram illustrating techniques according to an embodiment of the present invention. Step 702 includes selecting at least one migration service for an application based on analysis of application information and information pertaining to multiple migration services. The analysis can include, for example, application profiling, determining benchmark data, and/or pattern matching. Additionally, the information pertaining to multiple migration services can include, for example, service capability of each migration service, migration history of each service, and/or connection information for each migration service.

Step 704 includes creating a migration plan to migrate the application to a target cloud based on the at least one selected migration service. The migration plan can include one or more migration tasks including set-up, capture, prepare, and deploy. Step 706 includes executing the migration plan, utilizing the at least one selected migration service, to migrate the application to the target cloud.

The techniques depicted in FIG. 7 can also include receiving application information and information pertaining to multiple migration services. At least one embodiment of the invention can include receiving application information via manual user input, and/or receiving application information via automated discovery tool. Receiving application information via automated discovery tool can include receiving a list of servers in the application and corresponding credential information for each of the servers, logging-in to each of the servers using the corresponding credential information, and installing a discovery agent in each of the servers. Such an embodiment of the invention can also include running the discovery agent in each of the servers, collecting discovery data for each of the servers in the application, and generating application information based on the discovery data collected for each of the servers.

Additionally, the techniques depicted in FIG. 7 can include storing information pertaining to each of the multiple migration services in a database. Also, at least one embodiment of the invention includes receiving a migration result from the at least one selected migration service in the migration plan, and updating historical information pertaining to the at least one selected migration service based on the migration result.

Further, as noted herein, at least one embodiment of the invention includes determining whether the application migrated to the target cloud successfully. Such an embodiment of the invention can also include selecting a different migration service to migrate the application if the application did not migrate to the target cloud successfully, and/or providing configuration data to a pre-specified party to configure the application on the target cloud and verifying that the application is running correctly if the application migrated to the target cloud successfully.

The techniques depicted in FIG. 7 can additionally include identifying multiple components of the application. Also, at least one embodiment of the invention can include selecting a migration service for each of the components of the application based on analysis of application information and information pertaining to multiple migration services, creating a migration plan to migrate each of the components of the application to a corresponding target cloud based on the selected migration service for each of the components of the application, and executing the migration plan, utilizing the selected migration service for each of the components, to migrate each of the components of the application to the corresponding target cloud.

Further, at least one embodiment of the invention includes selecting a different migration service to migrate a component if the component did not migrate successfully. Also, such an embodiment can additionally include providing configuration data to a pre-specified party to configure a component on the corresponding target cloud and verifying that the component is functioning correctly if the component migrated successfully.

The techniques depicted in FIG. 7 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and configured to perform exemplary method steps.

Figure 8:
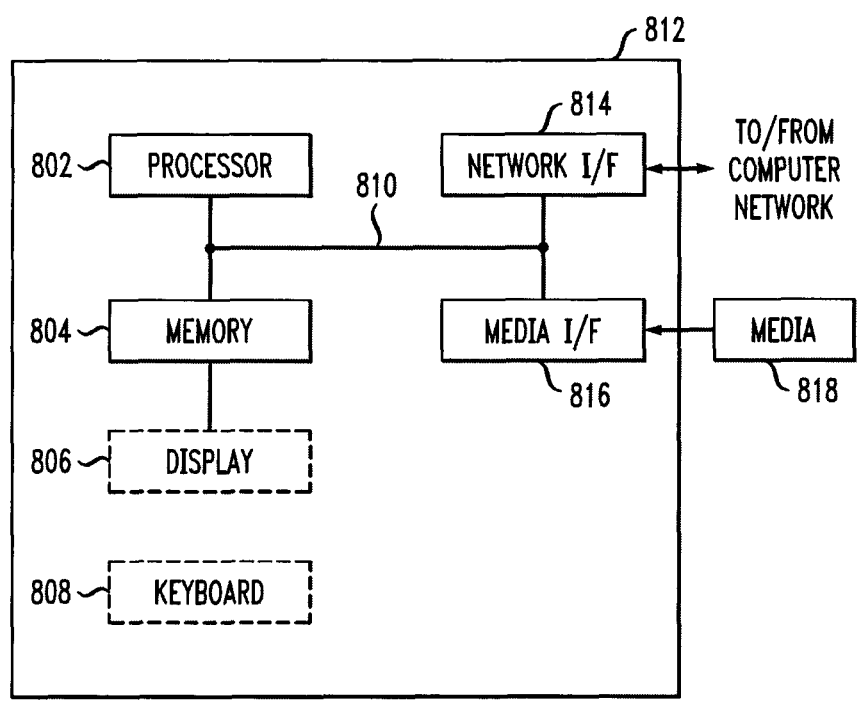
FIG. 8 is a system diagram of an exemplary computer system on which at least one embodiment of the invention can be implemented.

Additionally, an aspect of the present invention can make use of software running on a general purpose computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, radio frequency (RF), etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, matching application migration vendors based on application meta data and coordinating the migration vendors to complete an application migration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An article of manufacture comprising a non-transitory computer readable storage medium having computer readable instructions tangibly embodied thereon which, when implemented, cause a computer to carry out a plurality of method steps comprising:

decomposing an application migration task, associated with an application, into multiple sub-tasks;

generating an application vector representation of the application based on one or more properties of the application;

creating a migration performance matrix which sets a benchmark for migration cost for migrating the application, based on the application vector representation, using each of multiple migration services from a collection of multiple migration services;

defining a set of application programming interfaces for facilitating communication with the collection of multiple migration services, wherein the set of application programming interfaces comprises:

an application programming interface that creates an authenticated session with the application and returns a session token to be used for other application programming interface calls;

an application programming interface that releases the session token;

an application programming interface that retrieves user-specific information;

an application programming interface that creates user-specific information;

an application programming interface that initiates a separate, complete migration of an entire application;

an application programming interface that retrieves a migration task status;

an application programming interface that cancels a migration task; and an application programming interface that retrieves a migration task detail log;

selecting, from the collection of multiple migration services via at least one of the application programming interfaces, a plurality of the multiple migration services to perform the multiple sub-tasks of the application migration task based on a comparative analysis between (i) application vector representation and (ii) the benchmark for migration cost for migrating the application using each of the multiple migration services;

creating a migration plan to migrate the application to a target cloud based on the selected migration services, wherein the migration plan encompasses each of the multiple sub-tasks; and executing, via at least one of the application programming interfaces, the migration plan to migrate the application to the target cloud, wherein said executing comprises coordinating execution of each of the multiple sub-tasks via each of the selected migration services.

2. The article of manufacture of claim 1, wherein said analysis comprises at least one of application profiling, determining benchmark data, and pattern matching.

3. The article of manufacture of claim 1, wherein said information pertaining to each of the multiple migration services comprises at least one of service capability of each migration service, migration history of each service, and connection information for each migration service.

4. The article of manufacture of claim 1, wherein said migration plan comprises one or more migration tasks.

5. The article of manufacture of claim 4, wherein said one or more migration tasks comprise at least one of set-up, capture, prepare, and deploy.

6. The article of manufacture of claim 1, wherein the method steps comprise:

receiving application information and information pertaining to the multiple migration services.

7. The article of manufacture of claim 6, wherein said receiving comprises receiving application information via manual user input.

8. The article of manufacture of claim 6, wherein said receiving comprises receiving application information via automated discovery tool.

9. The article of manufacture of claim 8, wherein receiving application information via automated discovery tool comprises:

receiving a list of servers in the application and corresponding credential information for each of the servers;

logging-in to each of the servers using the corresponding credential information;

installing a discovery agent in each of the servers;

running the discovery agent in each of the servers;

collecting discovery data for each of the servers in the application; and generating application information based on the discovery data collected for each of the servers.

10. The article of manufacture of claim 1, wherein the method steps comprise:

storing information pertaining to each of the multiple migration services in a database.

11. The article of manufacture of claim 1, wherein the method steps comprise:

receiving a migration result from the at least one selected migration service in the migration plan; and updating historical information pertaining to the at least one selected migration service based on the migration result.

12. The article of manufacture of claim 1, wherein the method steps comprise:

determining whether the application migrated to the target cloud successfully.

13. The article of manufacture of claim 12, wherein the method steps comprise:

selecting a different migration service to migrate the application if the application did not migrate to the target cloud successfully.

14. The article of manufacture of claim 12, wherein the method steps comprise:

providing configuration data to a pre-specified party to configure the application on the target cloud and verifying that the application is running correctly if the application migrated to the target cloud successfully.

15. The article of manufacture of claim 1, wherein the method steps comprise:
identifying multiple components of the application.

16. The article of manufacture of claim 15, wherein the method steps comprise:
selecting at least one migration service for each of the multiple components of the application based on analysis of application information and information pertaining to multiple migration services;
creating a migration plan to migrate each of the multiple components of the application to a corresponding target cloud based on the at least one selected migration service for each of the multiple components of the application; and
executing the migration plan, utilizing the at least one selected migration service for each of the multiple components of the application, to migrate each of the multiple components of the application to the corresponding target cloud.

17. The article of manufacture of claim 16, wherein the method steps comprise:
selecting a different migration service to migrate a component if the component did not migrate successfully.

18. The article of manufacture of claim 16, wherein the method steps comprise:
providing configuration data to a pre-specified party to configure a component on the corresponding target cloud and verifying that the component is functioning correctly if the component migrated successfully.

19. A system comprising:
a memory; and
at least one processor coupled to the memory and configured for:
decomposing an application migration task, associated with an application, into multiple sub-tasks;
generating an application vector representation of the application based on one or more properties of the application;
creating a migration performance matrix which sets a benchmark for migration cost for migrating the application, based on the application vector representation, using each of multiple migration services from a collection of multiple migration services;
defining a set of application programming interfaces for facilitating communication with the collection of multiple migration services, wherein the set of application programming interfaces comprises:
an application programming interface that creates an authenticated session with the application and returns a session token to be used for other application programming interface calls;
an application programming interface that releases the session token;
an application programming interface that retrieves user-specific information;
an application programming interface that creates user-specific information;
an application programming interface that initiates a separate, complete migration of an entire application;
an application programming interface that retrieves a migration task status;
an application interface cancels a migration task; and
an application programming interface that retrieves a migration task detail log;
selecting, from the collection of multiple migration services via at least one of the application programming interfaces, a plurality of the multiple migration services to perform the multiple sub-tasks of the application migration task based on a comparative analysis between (i) application vector representation and (ii) the benchmark for migration cost for migrating the application using each of the multiple migration services;
creating a migration plan to migrate the application to a target cloud based on the selected migration services, wherein the migration plan encompasses each of the multiple sub-tasks; and
executing, via at least one of the application programming interfaces, the migration plan to migrate the application to the target cloud, wherein said executing comprises coordinating execution of each of the multiple sub-tasks via each of the selected migration services.

20. The system of claim 19, wherein said analysis comprises at least one of application profiling, determining benchmark data, and pattern matching.

* * * * *